(12) United States Patent
Chu et al.

(10) Patent No.: US 6,413,285 B1
(45) Date of Patent: *Jul. 2, 2002

(54) LAYERED ARRANGEMENTS OF LITHIUM ELECTRODES

(75) Inventors: May-Ying Chu, Oakland; Steven J. Visco, Berkeley; Lutgard C. DeJonghe, Lafayette, all of CA (US)

(73) Assignee: PolyPlus Battery Company, Berkeley, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 09/640,467

(22) Filed: Aug. 16, 2000

Related U.S. Application Data

(63) Continuation-in-part of application No. 09/431,190, filed on Nov. 1, 1999.

(51) Int. Cl.$^7$ .............................. H01M 4/04; H01M 4/36
(52) U.S. Cl. .................. 29/623.4; 429/218.1; 29/623.1
(58) Field of Search .............................. 429/218.1, 232; 29/623.4, 623.1

(56) References Cited

U.S. PATENT DOCUMENTS

| | | | |
|---|---|---|---|
| 4,162,202 A | | 7/1979 | Dey .......................... 204/2.1 |
| 4,981,672 A | * | 1/1991 | De Neufville .............. 423/464 |
| 5,100,523 A | * | 3/1992 | Helms ........................ 204/290 |
| 5,314,765 A | * | 5/1994 | Bates ......................... 429/194 |
| 5,338,625 A | | 8/1994 | Bates et al. .................. 429/193 |
| 5,342,710 A | | 8/1994 | Koksbang ................... 429/192 |
| 5,409,786 A | * | 4/1995 | Bailey ......................... 429/52 |
| 5,455,126 A | | 10/1995 | Bates et al. ................. 429/127 |
| 5,512,147 A | | 4/1996 | Bates et al. ............ 204/192.15 |
| 5,567,210 A | | 10/1996 | Bates et al. ................. 29/623.5 |

(List continued on next page.)

FOREIGN PATENT DOCUMENTS

| | | | |
|---|---|---|---|
| EP | 0111213 A2 | 11/1983 | ............ H01M/4/06 |
| EP | 0111214 B1 | 11/1983 | ............ H01M/4/06 |
| EP | 0875951 A1 | 11/1998 | ............ H01M/4/02 |
| EP | 0689260 B1 | 4/1999 | .......... H01M/10/40 |

OTHER PUBLICATIONS

Nippon Telegr & Teleph Corp., "Patent Abstracts of Japan," vol. 008, No. 119 (E–248), Jun. 5, 1984 & JP 59 031573 A, Feb. 20, 1984.
"R&D Thin Film Technology", Sep. 1997, *R &D Magazine*.
Steven D. Jones, et al., "Thin film rechargeable Li batteries", 1994, *Solid State Ionics*.
J.B. Bates, et al., "Thin–film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin–Film Lithium Electrolyte: Lithium Phosphorus Oxynitride," 02–97, *J. Electrochem. Soc.*, vol. 144, No. 2.

*Primary Examiner*—Gabrielle Brouillette
*Assistant Examiner*—Mark Ruthkosky
(74) *Attorney, Agent, or Firm*—Beyer Weaver & Thomas LLP

(57) ABSTRACT

A method employing a bonding layer is used to form active metal electrodes having barrier layers. Active metals such as lithium are highly reactive in ambient conditions. The method involves fabricating a lithium electrode or other active metal electrode without depositing the barrier layer on a layer of metal. Rather a smooth barrier layer is formed on a smooth substrate such as a web carrier or polymeric electrolyte. A bonding or alloying layer is formed on top of the barrier layer. Lithium or other active material is then attached to the bonding layer to form the active metal electrode. A current collector may also be attached to the lithium or active metal during the process.

59 Claims, 8 Drawing Sheets

U.S. PATENT DOCUMENTS

| | | | |
|---|---|---|---|
| 5,569,520 A | 10/1996 | Bates | 429/162 |
| 5,597,660 A | 1/1997 | Bates et al. | 429/191 |
| 5,612,152 A | 3/1997 | Bates | 429/152 |
| 5,648,187 A * | 7/1997 | Skotheim | 429/213 |
| 5,696,201 A | 12/1997 | Cavalloni et al. | 524/594 |
| 6,025,094 A | 2/2000 | Visco et al. | 429/231.95 |

* cited by examiner

LAYERED ARRANGEMENTS OF LITHIUM ELECTRODES

CROSS-REFERENCE TO RELATED APPLICATIONS

This application is a continuation-in-part of U.S. patent application Ser. No. 09/431,190 filed Nov. 1, 1999, titled "ENCAPSULATED LITHIUM ALLOY ELECTRODES HAVING BARRIER LAYERS," and naming May-Ying Chu, Steven J. Visco, and Lutgard C. DeJonghe as inventors. This application is also related to U.S. Pat. No. 6,025,094 issued Feb. 15, 2000, titled PROTECTIVE COATINGS FOR NEGATIVE ELECTRODES, and naming Steven J. Visco and May-Ying Chu as inventors. This application is also related to U.S. patent application Ser. No. 09/139,603 filed Aug. 25, 1998, titled "PLATING METAL NEGATIVE ELECTRODES UNDER PROTECTIVE COATINGS," and naming May-Ying Chu, Steven J. Visco and Lutgard C. DeJonghe as inventors. This application is also related to U.S. patent application Ser. No. 09/139,601, now U.S. Pat. No. 6,274,061 filed Aug. 25, 1998, titled "METHOD FOR FORMING ENCAPSULATED LITHIUM ELECTRODES HAVING GLASS PROTECTIVE LAYERS," and naming Steven J. Visco and Floris Y. Tsang as inventors. Each of these patent applications is incorporated herein by reference for all purposes.

BACKGROUND OF THE INVENTION

This invention relates to negative electrodes for use in batteries (e.g., lithium electrodes for use in lithium-sulfur batteries). More particularly, this invention relates to methods of forming alkali metal electrodes having a thin barrier layer.

In theory, some alkali metal electrodes could provide very high energy density batteries. The low equivalent weight of lithium renders it particularly attractive as a battery electrode component. Lithium provides greater energy per volume than the traditional battery standards, nickel and cadmium. Unfortunately, almost no rechargeable lithium metal batteries have yet succeeded in the market place. Lithium metal battery technology has not approached its potential.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits, which can dislodge from the negative electrode and thereby reduce the battery's capacity.

To address lithium's poor cycling behavior in liquid electrolyte systems, some researchers have proposed coating the electrolyte facing side of the lithium negative electrode with a "barrier layer." Such barrier layer must conduct lithium ions, but at the same time prevent contact between the lithium electrode surface and the bulk electrolyte. Many techniques for applying barrier layers have not succeeded.

Some contemplated lithium metal barrier layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium barrier layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LIPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

In both the in situ and ex situ techniques for fabricating a protected lithium electrode, one must start with a smooth clean source of lithium on which to deposit the barrier layer. Unfortunately, most commercially available lithium has a surface roughness that is on the same order as the thickness of the desired barrier layer. In other words, the lithium surface has bumps and crevices as large as or nearly as large as the thickness of the barrier layer. As a result, most contemplated deposition processes cannot form an adherent gap-free barrier layer on the lithium surface.

In addition, the high reactivity of lithium metal requires that lithium electrodes be fabricated in an environment free of oxygen, carbon dioxide, moisture, and nitrogen. These processing precautions add to the cost and difficulty in manufacturing suitable lithium metal electrodes.

For these reasons, lithium metal battery technology still lacks an effective mechanism for protecting lithium negative electrodes.

SUMMARY OF THE INVENTION

The present invention provides an improved method for forming active metal electrodes having barrier layers. Active metals include those metals that are highly reactive in ambient conditions and can benefit from a barrier layer when used as electrodes. The method involves fabricating a lithium electrode or other active metal electrode without depositing the barrier layer on a layer of metal. Rather the barrier layer is formed on a smooth substrate. A bonding or alloying layer is provided on top of the barrier layer, opposite the smooth substrate. Lithium or other active material is attached to the bonding layer to form the active metal electrode. A current collector may optionally be attached to the lithium or active metal during the process. In a preferred embodiment, the bonding layer is provided as foil.

One aspect of the invention provides a method of fabricating an active metal electrode. The method may be characterized by the following sequence: (a) providing a barrier layer laminate and (b) bonding active metal to a barrier layer employed in the barrier layer laminate. The barrier layer laminate includes (i) a barrier layer disposed on a substrate and (ii) a foil bonding layer disposed on the barrier layer, the foil bonding layer being capable of forming a bond with the active metal. Preferably, the active metal is lithium or an alloy of lithium having a thickness of at least about 0.2 micrometers. In some cases, the lithium layer may be significantly thicker, on the order of millimeters. Layers of this thickness may be suitable for some primary cell electrodes. The method may require a separate operation of attaching a foil bonding layer to the barrier layer to form the barrier layer laminate.

In one embodiment, the substrate on which the barrier layer is disposed is a releasable web carrier including a layer of copper, tin, zinc, aluminum, iron, a polymeric material, or combination thereof. In a preferred embodiment, the substrate on which the barrier layer is disposed is an electrolyte such as a polymeric electrolyte. This approach has the advantage of producing a laminate that already contains both a negative electrode and the electrolyte. This product can be stored or handled and then bonded to a positive electrode to produce a laminated battery simply and efficiently. In a specific embodiment, the polymeric electrolyte is a polyalklyene oxide (such as a polyether), a polyimine, a polythioether, a polyphosphazene, a fluorinated polymer, or a polymer blend, polymer mixture, or copolymer thereof (e.g., a polyvinylidene-hexafluropropylene copolymer).

The barrier layer may be formed on the substrate by, for example, a physical deposition process or a chemical vapor deposition process. The resulting barrier layer should form a substantially impervious layer that is conductive to ions of the active metal. In one embodiment, the barrier layer is a glass layer that includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide. In an alternative embodiment, the barrier layer is made from an organic polymeric material such as a nitrogen or phosphorus containing polymer. In a specific embodiment, the barrier layer is a glass layer having a thickness of between about 50 angstroms and 5 micrometers, more preferably between about 500 angstroms and 2000 angstroms. Regardless of composition, the barrier layer preferably has an ionic conductivity of between about $10^{-8}$ and about $10^{-2}$ (ohm-cm)$^{-1}$.

In one embodiment, the foil bonding layer is not substantially reactive with moisture and air. For example, the foil bonding layer may be made from a metal such as aluminum, an aluminum alloy, silicon, zinc, manganese, and the like. In a specific embodiment, the bonding layer is an aluminum or aluminum alloy layer having a thickness of at least about 0.1 micrometers.

In addition to the above-mentioned processing, the invention may optionally include attaching a current collector on the active metal to form a lithium laminate. This is then used in bonding the active metal to the foil bonding layer of the barrier layer laminate. In an alternative embodiment, bonding active metal to the barrier layer comprises bonding a free standing lithium layer to the barrier layer laminate.

Regardless of whether the active metal is used alone or in conjunction with a current collector, bonding active metal to the barrier layer may involve pressing an active metal layer to the barrier layer laminate. This may be accomplished with a hot press, for example. In an alternative embodiment, bonding the active metal to the barrier layer involves evaporating or sputtering the active metal onto the barrier layer laminate.

Another aspect of the invention pertains to active metal electrodes formed by a method as outlined above. Batteries formed from such electrodes are also within the scope of this invention. One example of such batteries is a lithium-sulfur battery.

Yet another aspect of the invention provides a barrier layer laminate for use in fabricating an active metal electrode. The barrier layer laminate may be characterized by the following features: (i) a substantially smooth and flat substrate; (ii) a barrier layer disposed on the substrate, and (iii) a foil bonding layer disposed on the barrier layer. As explained above, the barrier layer should provide a substantially impervious layer which is conductive to ions of the active metal, and the foil bonding layer should be capable of forming a bond with the active metal. The properties and compositions of the components of layers comprising the laminate may be as described above.

Certain aspects of the invention pertain to an active metal electrodes (or laminates serving as electrode precursors) having a bonding layer sandwiched between two separate active metal layers. In one embodiment, such structure may be characterized by the following elements: (i) a barrier layer forming a substantially impervious layer as described above; (ii) a first active metal layer having a first side disposed on to the barrier layer; (iii) a bonding layer disposed on a second side, opposite the first side, of the active metal layer; and (iv) a second active metal layer disposed on the bonding layer. In this arrangement, the bonding layer is sandwiched between the first and second active metal layers. In a further preferred embodiment, the structure also includes a substantially smooth and flat substrate disposed on a first side of the barrier layer, such that the active metal layer is disposed on a second side, opposite the first side, of the barrier layer. In some cases, the bonding layer is a foil bonding layer.

In a specific embodiment, the barrier layer laminate is constructed from (i) a barrier layer; (ii) an active metal layer having a first side disposed on to the barrier layer; and (iii) a foil bonding layer disposed on a second side, opposite the first side, of the active metal layer. Of course, such embodiment may further include a substantially smooth and flat substrate disposed on a first side of the barrier layer, such that the active metal layer is disposed on a second side, opposite the first side, of the barrier layer.

Various methods are available for preparing the above described boding layer "sandwich" structure. One example of such method is characterized by the following sequence: (a) providing a barrier layer laminate including a barrier layer disposed on a substrate; (b) providing an active metal layer laminate comprising at least one active metal layer and a bonding layer affixed to one another; and (c) bonding at least the active metal laminate and the barrier layer laminate to form the electrode/laminate structure. In the end, the bonding layer is sandwiched between two separate active metal layers, at least one of which was provided in the active metal layer. Further, one of the two separate active metal layers is affixed to the barrier layer provided in the barrier layer laminate. In a preferred embodiment, the bonding layer is a foil.

In a specific embodiment, the active metal laminate consists essentially of the bonding layer and a single active metal layer. In this embodiment, the bonding process comprises (a) bonding a second active metal layer to the bonding layer of the active metal laminate and (b) bonding the barrier layer of the barrier layer laminate to the single active metal layer of the active metal laminate.

In an alternative specific embodiment, the barrier layer laminate further comprises a second active metal layer disposed on a side of the barrier layer opposite the substrate. In this embodiment, the active metal laminate may comprise the bonding layer and a single active metal layer. Then the bonding operation comprises bonding the second active metal layer to the bonding layer of the active metal laminate.

In alternative specific embodiments, the bonding layer is divided into two separate layers, one on the barrier layer laminate and the other on the active metal laminate. In this embodiment, the barrier layer laminate includes (a) a second active metal layer disposed on a side of the barrier layer opposite the substrate and (b) a second bonding layer disposed on a side of the second active metal layer opposite the barrier layer. Further, the active metal laminate includes the bonding layer (which is separate from the second bonding layer) and a single active metal layer. The bonding operation requires bonding at least the active metal laminate and the barrier layer laminate comprises bonding the second bonding layer of the barrier layer laminate to the bonding layer of the active metal laminate.

In each of the above embodiments, the active metal laminate may include a current collector affixed to a side of the single active metal layer that is opposite the bonding layer.

These and other features of the invention will be further described and exemplified in the drawings and detailed description below.

DETAILED DESCRIPTION OF THE PREFERRED EMBODIMENTS

Fabrication Methods

Figure 1A:
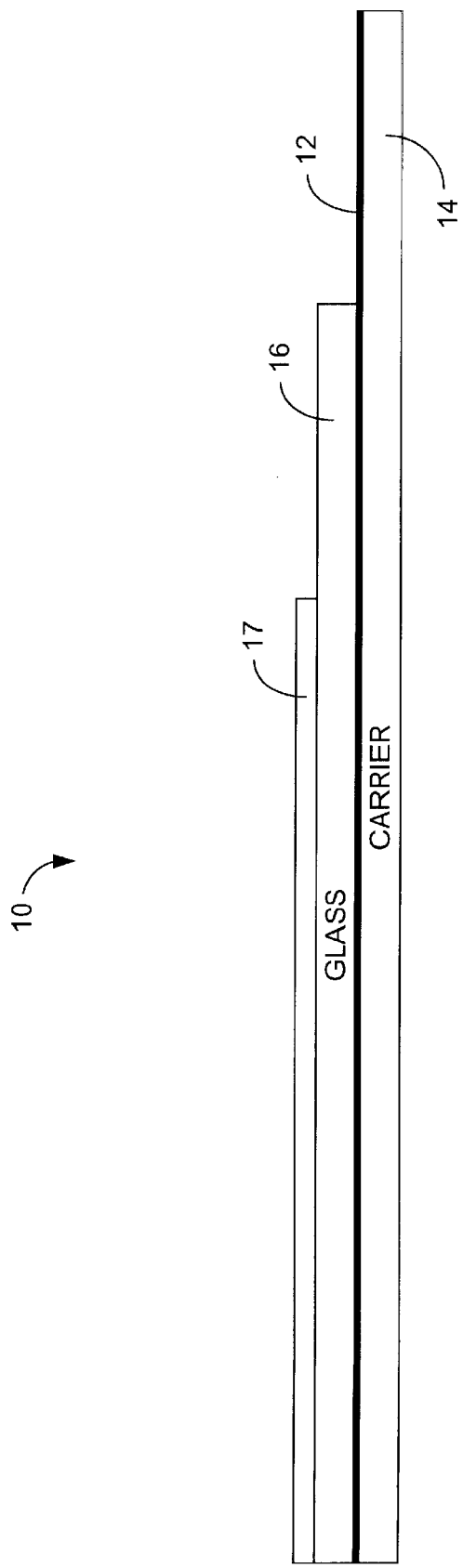
FIG. 1A is a schematic illustration a pre-formed barrier layer laminate including a foil bonding layer on a polymer or glass barrier layer, which is, in turn, on a carrier.
Figure 1B:
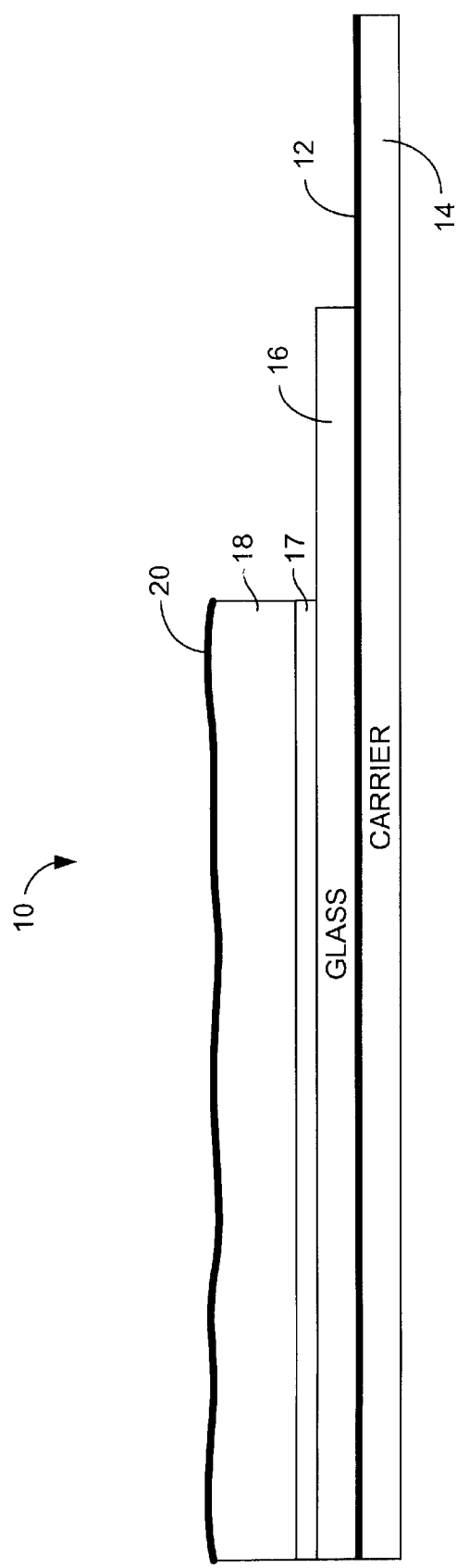
FIG. 1B is a schematic illustration of a lithium electrode being prepared according to an embodiment of the invention including forming a lithium layer on the foil bonding layer of the barrier layer laminate illustrated in FIG. 1A.

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to the class of active metal battery systems (e.g., batteries having negative electrodes of alkali metals, alkaline earth metals, and certain transition metals).

FIGS. 1A–B, 2A, and 2B illustrate three fabrication processes of the present invention. Considering FIG. 1A first, a lithium electrode 10 is fabricated as a laminate in the following manner. Optionally, a thin layer of a release agent 12 is deposited on a web carrier 14 by evaporation for example. This web carrier and the release agent should have a very smooth surface. Deposition of the release agent is followed by deposition of a single ion conductor 16 onto release agent 12 by a suitable process such as sputtering, chemical vapor deposition, coating, extrusion/calendering, or spray coating. Layer 16 serves as a barrier layer in the completed electrode and is therefore preferably a single ion conductor which conducts ions of the active metal used in the electrode (e.g., lithium). Because barrier layer 16 is deposited on a very smooth surface, it too will be smooth and continuous.

Next, after the barrier layer is formed, a bonding layer 17 is formed on barrier layer 16. This material should easily and strongly bond with the active metal. Preferably it is also substantially non-reactive with ambient agents such as moisture and other gases in air. Aluminum and aluminum alloys work well as bonding layer materials when lithium is the active metal. Preferably, the bonding layer is provided as a foil.

Lithium 18 (or other active metal for the electrode) is deposited on bonding layer 17 by evaporation for example. Then, a current collector 20 (e.g., a copper layer of about 1000 angstroms to one micrometer thickness) is optionally formed on lithium layer 18 by a conventional process such as evaporation or sputtering. Finally, the barrier layer/lithium layer/current collector laminate is separated from the carrier 14, with release layer 12 giving way. The bonding layer facilitates adherence of the lithium to the barrier layer to allow clean separation without damaging the barrier layer.

The resulting structure may be referred to as an "encapsulated electrode." Because the lithium is encapsulated within the barrier layer and the current collector, it may be transported, stored, and otherwise handled without the precautions normally required for a lithium metal electrode. Note that in some embodiments, a current collector is not employed. Rather, the layer of lithium is protected on one side and exposed on the other.

It is possible that the barrier layer laminate can be produced in a continuous fashion. A fresh layer is formed on the web as it passes through each of a series of stations. The barrier layer laminate, including web, the release agent, the barrier layer, and the bonding layer, may be stored under ambient conditions.

Because the web carrier supports continuous fabrication of the electrode laminate through a series of deposition reactors, it should withstand high temperatures and wide pressure ranges. Examples of suitable web materials include plastics such as polyethylene terephthalate (PET), polypropylene, polyethylene, polyvinylchloride (PVC), polyolefins, and polyimides. The web carrier should have a thickness and tensile strength suitable for web handling at the line speeds dictated by the metal and glass or polymer deposition steps.

The release agent serves to release the subsequently formed electrode from the web carrier. The particular release layer chosen depends upon the types of web carrier and barrier layer employed. Suitable release agents are known in the art. In a specific embodiment, the release layer is a 50 angstrom copper film formed by evaporation or sputtering. The release agent should be as thin as possible while still retaining release properties, and easily dissolving in the target battery environments. In the case of a copper release, a thick copper release film could potentially block ionic transport to the barrier layer. Therefore a thin Cu layer is envisaged whereby, once in the battery environment, the thin copper layer is removed by corrosion and/or dissolution, exposing the barrier layer to the battery electrolyte.

The encapsulated electrode 10 resulting from this process includes a lithium metal layer 18 sandwiched between current collector 20 and barrier layer 16. Because the lithium layer is formed after the barrier layer (rather than having the barrier layer deposited on a potentially rough lithium surface as in conventional processes), the barrier layer is of high quality. That is, the barrier layer is generally gap-free and adherent when produced according to this invention. As mentioned, it may be difficult to directly deposit glass onto a lithium film due to the high degree of surface roughness of the lithium film relative to the sputter deposited glass film thickness (e.g., 300 to 1500 angstroms).

Figure 2A:
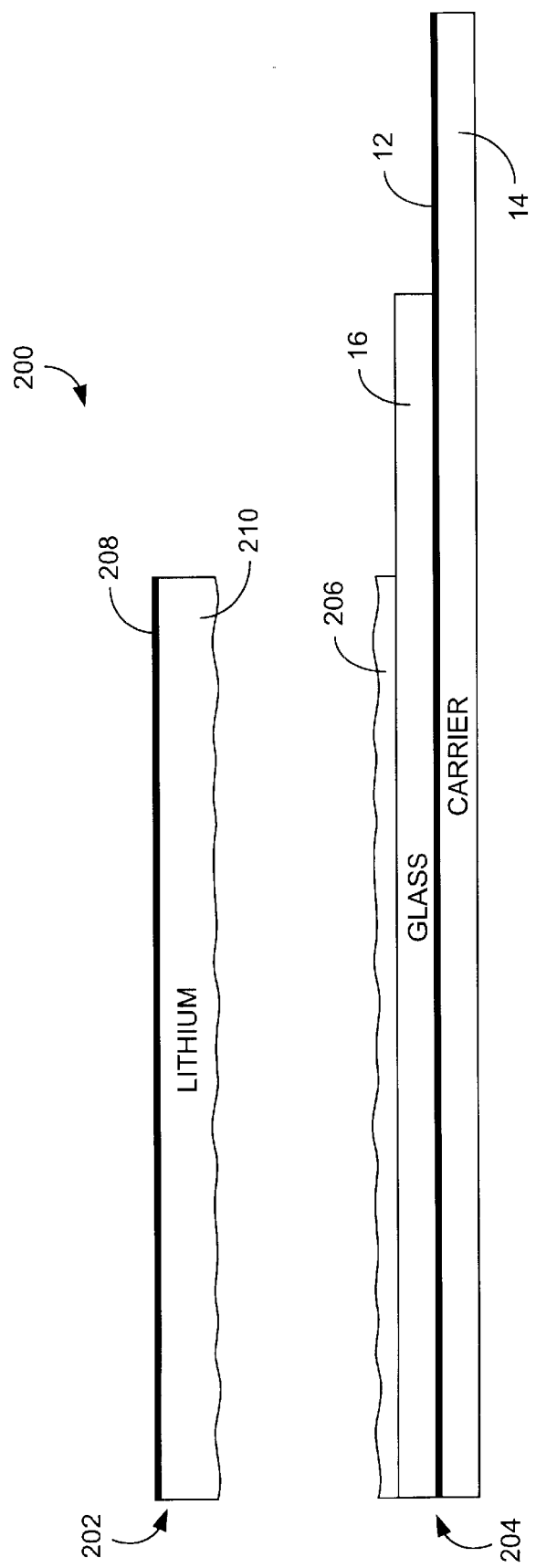
FIG. 2A is a schematic illustration of a lithium electrode being prepared according to a preferred embodiment of the invention in which a layer of lithium on a pre-formed current collector is bonded to a foil bonding layer on a barrier layer laminate.
Figure 2B:
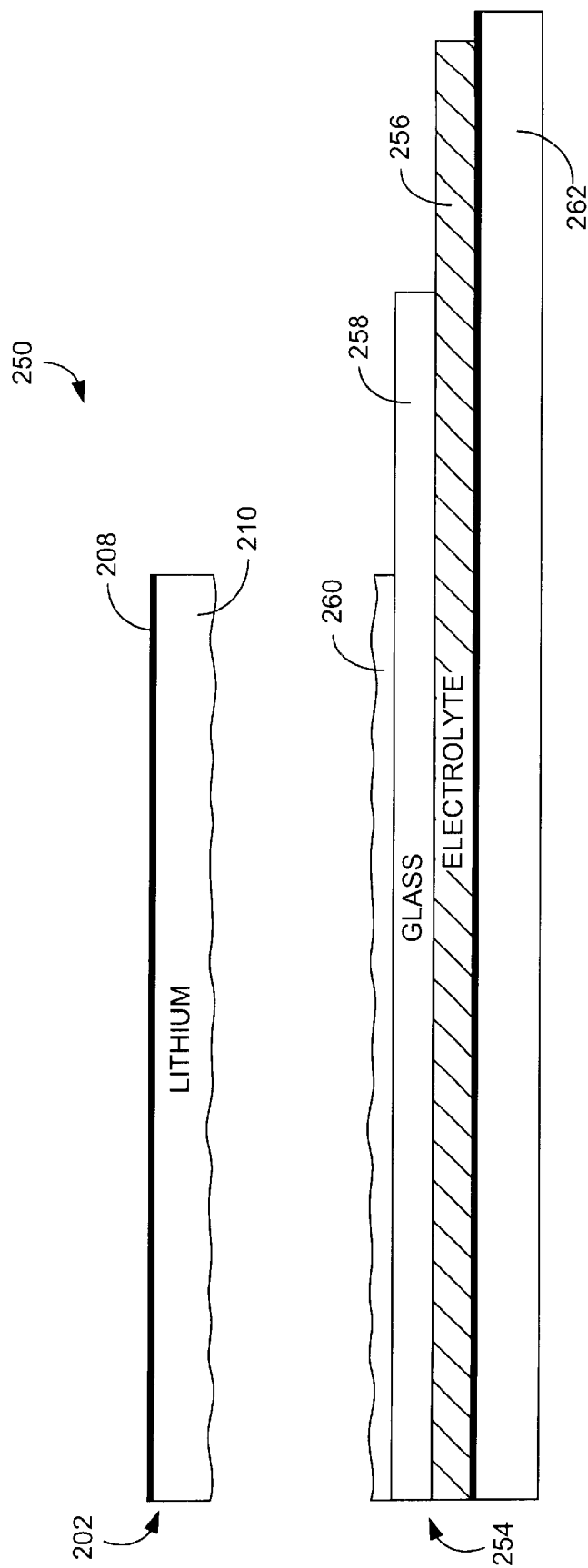
FIG. 2B is a schematic illustration of a lithium electrode being prepared according to another preferred embodiment of the invention including bonding a lithium layer as in the second embodiment to a preformed laminate having a battery electrolyte layer in addition to the barrier layer and foil bonding layer.

FIGS. 2A and 2B illustrate preferred embodiments of the present invention. In these embodiments, a current collector is employed. Note that such current collectors are optional. When free standing lithium sheets are employed as active material, a current collector generally is not required. However, when sputtering or a similar deposition process deposits lithium, then a current collector may serve as a substrate for the lithium. Note also that the embodiments of FIGS. 2A and 2B show release layers. These too are optional and may be unnecessary for some carrier layer/barrier layer combinations.

In FIG. 2A, two separate pre-formed pieces are brought together and bonded. The lithium (or other active metal) is provided as a free standing layer, either by itself or in conjunction with a current collector. The second component is a barrier layer laminate of the type described above. In the embodiment shown, a partially fabricated lithium electrode 200 includes two primary components: lithium laminate 202 and a barrier layer laminate 204. The first of these includes a lithium sub-layer, the second a bonding layer (preferably made from foil). The two laminates are brought into alignment so that lithium and bonding layers face one another and can be bonded to form a single electroactive layer in a laminated electrode. The barrier layer laminate may be stored under ambient conditions and, in some cases, the bonding between it and the lithium layer can take place under ambient or near ambient conditions.

As shown, barrier layer laminate 204 includes a carrier 14, a release agent 12, a barrier layer 16, and a bonding layer 206 that may be formed on barrier layer 16 by evaporation or sputtering for example. In a preferred embodiment, however, the bonding layer is a foil layer that is applied to the laminate by pressing or rolling, with or without application of heat. Lithium laminate 202 includes a current collector 208 and a lithium layer 210. Current collector 208 is preferably a smooth metal sheet or a metallized plastic sheet. Laminate 202 may be formed by various techniques. For example sheets of lithium and the current collector metal may be extruded or calendered together. Alternatively, laminate 202 may be formed by depositing lithium on current collector 208 via evaporation or other suitable process. Such processing generally provides relatively thin lithium layers.

The resulting electrode comprises a stack including a current collector as the bottom layer, a single ion conducting barrier layer as the top layer, and a lithium or lithium alloy layer sandwiched between the current collector and the barrier layer. The electroactive layer may be a lithium alloy if the lithium starting material is an alloy. Also, depending upon how much material is employed in the bonding layer, it may form an alloy with the lithium. Depending upon the chosen bonding technique and the diffusion coefficient of the bonding in the active metal, the bonding may (i) remain largely as a separate layer localized at barrier layer side of the active electrode or (ii) dispersed throughout the active metal to form an alloy.

FIG. 2B illustrates another preferred embodiment for carrying out the invention. In this embodiment, an encapsulated electrode is again formed from two laminates: a lithium laminate 202 (similar to the arrangement employed in the second embodiment) and an electrolyte laminate 254. As with the second embodiment, the lithium laminate contains the electrode's lithium. The electrolyte laminate contains the bonding layer. During processing, the two laminates are brought into position so that the lithium and bonding layers face each other and can be bonded. Again, the current collector is an optional component that is most desirable when the lithium layer is formed by sputtering or a similar process.

Electrolyte laminate 254 includes an electrolyte layer 256 which serves as a substrate for deposition of a barrier layer 258 by sputtering, chemical vapor deposition, or other suitable process. A bonding layer 260 is deposited on barrier layer 258 by evaporation or other suitable process. In a preferred embodiment, however, bonding layer 260 is a foil bonding layer that is applied to laminate 254 by pressing, rolling, or other appropriate lamination technique. Electrolyte layer 256 serves as the electrolyte in a subsequently fabricated battery cell. Thus, it should be made from a suitable electrolyte material (e.g., a polymer electrolyte or gellable polymer) for the cell under consideration. Barrier layer 258 is similar to barrier layer 16 of the first and second embodiments except that it is formed on an electrolyte substrate rather than a web carrier substrate (carrier 14). In addition, no release agent is required in this embodiment, as the goal is to form a partially fabricated cell that includes both the negative electrode and the electrolyte.

Optionally, the electrolyte laminate 254 includes a carrier web 262 for web handling ease. In some embodiments, electrolyte layer 256 will be very thin (e.g., on the order of 2 microns), and preferably would be releasable from a carrier material (e.g., 10–20 micrometer thick PET). Carrier web 262 may have the properties of carrier 14 in the other embodiments.

The ultimate structure produced by the third process includes an electrolyte layer as a bottom layer, a current collector as the top layer, a lithium or lithium alloy layer affixed to the current collector, and a barrier layer affixed to the electrolyte layer. The barrier layer and lithium metal layers are also affixed to one another.

In this third embodiment, there is no need for a release layer and sputtering of sacrificial copper is avoided. The electrolyte layer can be of such a thickness that it is easily handled on a web (10 to 20 micrometers thick). Alternatively, the polymer can be very thin supported on a thicker releasable sheet (e.g., 1 micrometer of polymer electrolyte on 12 micrometer PET).

The processes of FIGS. 2A and 2B are preferably conducted in a continuous fashion. In both cases, a barrier layer laminate and a lithium laminate are initially formed and then bonded to form a single encapsulated electrode. The bonding may involve pressing the two laminates together, possibly while applying heat. Specifically, bonding may be accomplished by passing the two laminates through rollers. Hot pressing or hot rolling may be employed. It is, of course, possible that the two laminates are bonded in a batch process.

Note that in the encapsulated electrodes produced in accordance with all three embodiments, the current collector includes a first surface that is exposed to the ambient and a second surface that intimately contacts the lithium layer. The lithium layer includes a first surface that forms the interface with the current collector and a second surface that intimately contacts the bonding layer. The barrier layer includes a first surface that contacts the bonding layer and a second surface that is exposed to the ambient (or an electrolyte layer in the case of the embodiment of FIG. 2B). The interfaces at the surfaces of the lithium layer should be sufficiently continuous or intimate that moisture, air, electrolyte, and other agents from the ambient are prevented from contacting the lithium metal. In addition, the interface the lithium and the current collector should provide a low resistance electronic contact. Finally, the interface between the lithium alloy or bonding layer and the barrier layer should provide a low resistance ionic contact. In the third embodiment, the final structure is an electrode/electrolyte laminate in which the electrolyte layer is affixed to the outer surface of barrier layer where an intimate, low ionic resistance contact is made.

Preferably, the current collectors employed with this invention form a physically rigid layer of material that does not alloy with lithium. They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally effect the electrochemical properties of the lithium layer. This also ensures that the current collector material does not redistribute during the charge and discharge cycles in which lithium is alternately plated and electrolytically consumed. The thickness of the current collector depends upon the material from which it is made. For many embodiments of interest, the current collector is between about 1 and 25 micrometers thick, more preferably between about 6 and 12 micrometers thick.

The current collector and active metal layer may be attached by various techniques. For example, the current collector/active metal laminate may be formed from freestanding layers such as calendering, extrusion or a similar processing technique. Alternatively, the active material may be deposited on a current collector layer in situ. The deposition techniques employed depend upon the current collector and active electrode materials. Examples of deposition techniques that may be suitable in various cases include chemical vapor deposition, evaporation, and sputtering.

In one embodiment, the current collector is provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

In an alternative embodiment, the current collector is coated with a non-electronically conductive outer layer such as a second barrier layer. In this embodiment, a current collector or terminal must still be affixed to the lithium electrode. This may take the form of a metal tab or other electronically conductive member that extends beyond the barrier layers.

The current collector may be prepared by a conventional technique for producing current collectors. In the second and third embodiments, the current collectors may be provided as sheets of the commercially available metals or metallized plastics. The surfaces of such current collectors may be prepared by standard techniques such as electrode polishing, sanding, grinding, and/or cleaning. In general, the surface of the current collector should be smoother than the thickness of the active metal layer subsequently deposited onto it. For many applications, a current collector with a surface roughness on the order of micrometers should be suitable.

Alternatively, the current collector metals may be formed by a more exotic technique such as evaporation of the metal onto a substrate, physical or chemical vapor deposition of the metal on a substrate, etc. Such processes may be performed as part of a continuous process for constructing the electrode.

The barrier layer serves to protect the lithium metal in the electrode during cell cycling. It should protect the lithium metal from attack from the electrolyte and reduce formation of dendrites and mossy deposits. In addition, barrier layer should be substantially impervious to agents from the ambient. Thus, it should be substantially free of pores, defects, and any pathways allowing air, moisture, electrolyte, and other outside agents to penetrate though it to the metal layer. In this regard, the composition, thickness, and method of fabrication may all be important in imparting the necessary protective properties to the barrier layer. These features of the barrier layer will be described in further detail below. Preferably, though not necessarily, the barrier layer will have a glassy or amorphous morphology.

Preferably, the barrier layer is so impervious to ambient moisture, carbon dioxide, oxygen, etc. that a lithium electrode can be handled under ambient conditions without the need for elaborate dry box conditions as typically employed to process other lithium electrodes. Because the barrier layer described herein provides such good protection for the lithium (or other reactive metal), it is contemplated that electrodes and electrode/electrolyte composites of this invention may have a quite long shelf life outside of a battery. Thus, the invention applies to negative electrodes prior to assembly in a battery and electrode/electrolyte laminates themselves, as well as batteries containing a negative electrode in accordance with this invention. Such negative electrodes and electrode/electrolyte laminates may be provided in the form of sheets, rolls, stacks, etc. Ultimately, they are integrated with other battery components to fabricate a battery. The enhanced stability of the electrodes of this invention will greatly simplify this fabrication procedure.

The barrier layer should be an inorganic or organic (or combined inorganic-organic) material that conducts lithium ion but does not significantly conduct other ions. In other words, it should be a single ion conductor. It should also be stable in the voltage window employed in the cell under consideration. Still further it should be chemically stable to the electrolyte, at least within the voltage window of the cell. Finally, it should have a high ionic conductivity for the lithium ion.

The barrier layer may be formed directly on a carrier or electrolyte by any suitable process. It can be deposited on these substrates by techniques such as physical vapor deposition, coating, extrusion/calendering, spray coating, and chemical vapor deposition. In a specific embodiment, it is deposited by plasma enhanced chemical vapor deposition (PECVD). Examples of suitable physical vapor deposition processes include sputtering and evaporation (e.g., electronbeam evaporation). A PECVD technique is described in U.S. patent application Ser. No. 09/086,665, filed on May 19, 1998, and titled PROTECTIVE COATINGS FOR NEGATIVE ELECTRODES, which was previously incorporated herein by reference.

Most generally, the lithium layer described above can be replaced with any metal, any mixture of metals capable of functioning as a negative electrode. However, the barrier layers of this invention will find most use in protecting highly reactive metals such as alkali metals and alkaline earth metals. The thickness of the metal layer used in the electrodes of this invention depends upon the cell construction, the desired cell capacity, the particular metal employed, etc. For many secondary cell applications, the metal layer thickness will preferably lie between about 0.2 to 100 micrometers. In other cases, such as primary battery applications, much thicker metal layers may be employed. For example, the metal layer may be on the order of millimeters thick.

In one preferred embodiment, the materials for the negative electrodes is a metal such lithium or sodium or an alloy of one of these with one or more additional alkali metals and/or alkaline earth metals, and/or aluminum. Preferred alloys include lithium aluminum alloys, lithium silicon alloys, lithium tin alloys, and sodium lead alloys (e.g., $Na_4Pb$). Other metallic electrode materials may include alkaline earth metals such as magnesium and their alloys, aluminum, and transition metals such as, zinc, and lead and their alloys. The barrier layer must be made from a compatible material. The material should be conductive to ions of the electrochemically active metal or metals in the negative electrode.

If the electrode is formed as a laminate including an electrolyte layer as in the third embodiment, that electrolyte should be a compatible solid state electrolyte or a compatible gellable material. Generally, though not necessarily, the solid state material is a polymeric material. Examples of polymeric electrolytes include polyethers, polyimines, polythioethers, polyphosphazenes, and polymer blends, mixtures, and copolymers thereof in which an appropriate electrolyte salt has optionally been added. Preferred polyethers are polyalkylene oxides, more preferably, polyethylene oxide. It is also possible, that the electrolyte layer is a ceramic or glass such as beta alumina-type materials. Specific examples include sodium beta alumina, Nasicon™ or Lisicon™ glass or ceramic. In one embodiment, the barrier layer in the first or second embodiment is made sufficiently thick that it can serve as an electrolyte itself.

If a gellable material is employed, it must be convertible to a gel state electrolyte when mixed with a suitable solvent. Examples of gellable materials include polyacrylonitrile, polyvinylidene difluoride (PVDF), or polyethylene oxide (PEO), can be used.

Various other laminate structures and methods may employ a bonding layer in accordance with this invention. A few of these structures and methods are depicted in FIGS. 2C through 2H.

Figure 2C:
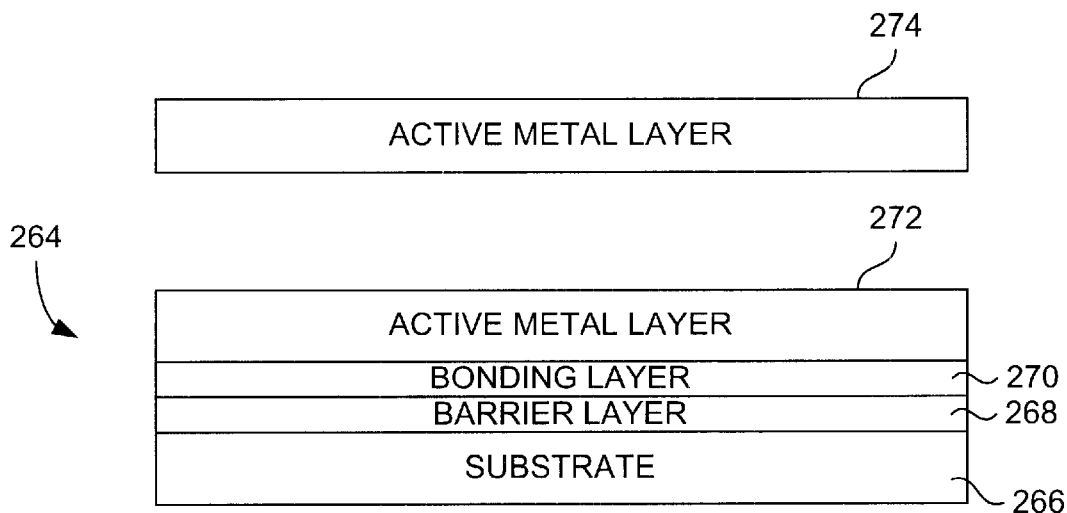
FIG. 2C is an illustration of an embodiment in which a barrier layer laminate includes a barrier layer, a bonding layer, and an active metal layer.

FIG. 2C shows a barrier layer laminate 264 including a substrate 266 (e.g., an electrolyte such as Kynar or an inert disposable carrier), a barrier layer 268 and a bonding layer 270 arranged in a manner as described above. In addition, barrier layer laminate 264 has a thin layer of active metal 272 having an exposed top surface and affixed to bonding layer 270. Thus, bonding layer 270 is sandwiched between the barrier layer 268 and the thin active metal layer 272. In a preferred embodiment, active metal layer 272 is deposited as a thin layer by evaporation, sputtering, CVD, or other technique as appropriate. In some embodiments, it may be a foil. If substrate 266 is an electrolyte layer, bonding layer 270 may prevent deleterious reactions between the electrolyte layer and the active metal layer 272.

Depending upon the application, laminate 264 may itself serve as an active metal electrode. In the case of a secondary battery, in which relatively little active metal is required, structure 264 may be a suitable electrode. However, in other applications such as primary battery applications, additional active material is required. Such additional metal may be provided via a separate step. For example, as shown in FIG. 2C, a free-standing second active metal layer 274 (e.g., lithium foil) may be bonded to layer 272 of barrier layer laminate 264. Bonding may be accomplished by rolling or other suitable procedure.

Note that second active metal layer 274 may be provided with a current collector to facilitate construction of the electrode. In a preferred embodiment, bonding layer 270 is provided as foil such as aluminum foil or an aluminum alloy foil.

Figure 2D:
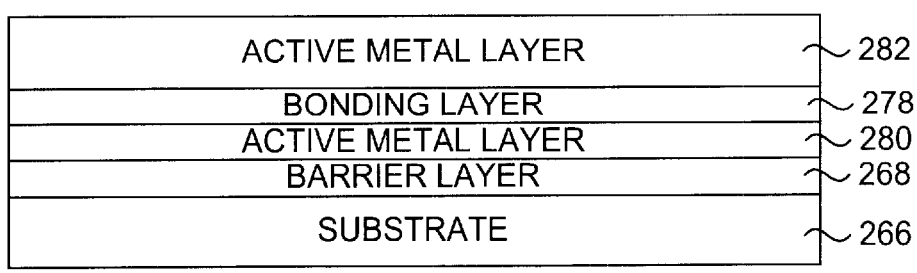
FIG. 2D is an illustration of an embodiment in which an electrode/laminate structure includes a barrier layer and a bonding layer, which is sandwiched between a first active metal layer and a second active metal layer.

FIG. 2D illustrates an alternative laminate/electrode structure 290 in which a bonding layer 278 (e.g., aluminum foil) is sandwiched between two separate active metal layers 280 and 282. This structure may serve as the electrode itself or a precursor to the final electrode. As shown, laminate electrode 290 includes a substrate 266 and a barrier layer 268 as illustrated in FIG. 2C. However, rather than have the bonding layer directly affixed to the barrier layer—as in the case o FIG. 2C—the bonding layer 278 is affixed to barrier layer 268 via the first active metal layer 280. The second active metal layer 282 provides additional material for electrochemical reaction. While not shown in this figure, active metal layer 282 may include a current collector affixed to its outer side (the side facing away from the barrier layer and bonding layer).

Figure 2E:
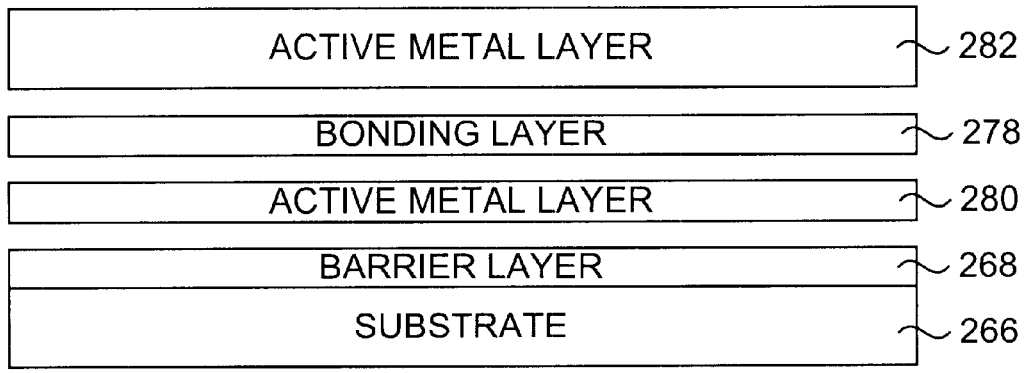
FIGS. 2E–2H are illustrations depicting four different methods of forming the structure shown in FIG. 2D.

The laminate/electrode structure 290 can be prepared in various ways, including the four methods depicted in FIG. 2E through FIG. 2H. As shown in FIG. 2E, each of the bonding and active metal components is provided as a free-standing layer such as a foil. Thus, one component is first active metal layer 280, another component is bonding layer 278 and a third component is second active metal layer 282. A fourth component is a barrier layer laminate comprised of substrate 266 and barrier layer 268. The four components are arranged as depicted and bonded together to form an active metal electrode.

Figure 2F:
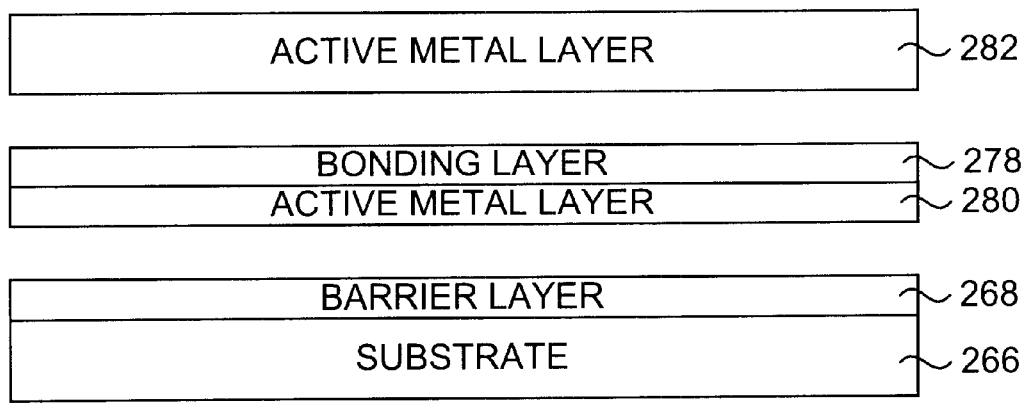

As depicted in FIG. 2F, laminate/electrode structure 290 can be prepared from three separate components. The first is a barrier layer laminate comprised of layers 266 and 268 as described above. The second is an active metal laminate comprised of first active metal layer 280 and bonding layer 278. The final component is active metal layer 282. These three components are arranged as depicted and then bonded to form structure 290.

Figure 2G:
Figure 2G:

Another approach is depicted in FIG. 2G. Here, there are only two components. The first is a barrier metal laminate including substrate 266, barrier layer 268, and first active metal layer 280. The second component is an active metal laminate comprising bonding layer 278 and second active metal layer 282. These two components are arranged as shown, and then bonded to form structure 290.

Figure 2H:
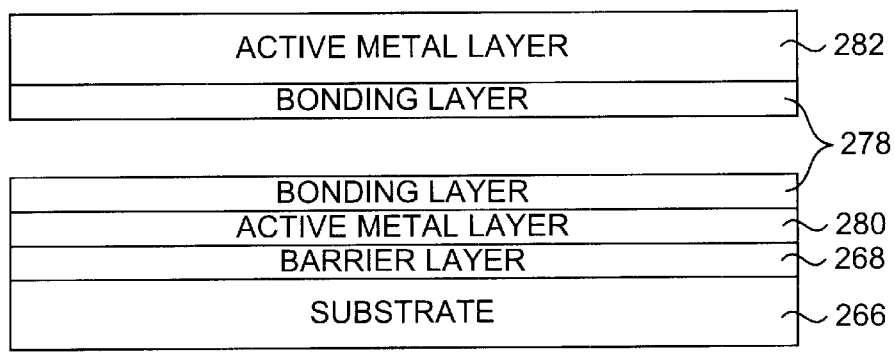

Yet another approach is depicted in FIG. 2H. Here again there are only two components used in the final bonding operation. This approach is similar to that of FIG. 2G, except that the bonding layer 278 is divided between the barrier layer laminate and the active metal laminate. The barrier layer laminate includes layers 266, 268, and 280, plus a fraction of layer 278. The active metal laminate includes second active metal layer 282 plus a fraction of bonding layer 278. The two components are arranged as shown and bonded so that the two fractions of bonding layer 278 bond to one another to form structure 290.

In the above examples, the free-standing components used in the bonding processes are preferably foils, such as lithium foil and aluminum foil. The active metal laminate may be laminate of two foils such as a lithium foil and an aluminum foil. The various components are preferably bonded in a suitable static or continuous manner. Static hot pressing may be employed or continuous rolling or calendering may be employed, for example.

Figure 2I:
FIG. 2I is an illustration of an alternative embodiment in which the barrier layer is formed directly on a free-standing smooth bonding layer.
Figure 2I:
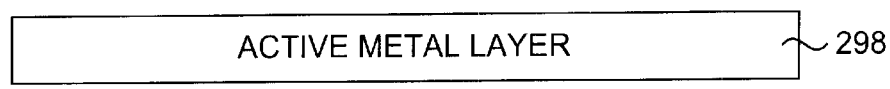

As indicated above, one motivation for this invention is that fact that commercial lithium layers often have rough surfaces and therefor do not provide good substrates for forming high quality barrier layers. However, foil bonding layers such as some aluminum or aluminum alloy foils are sufficiently smooth and clean, as well as free standing, that they can serve as substrates for depositing the barrier layer. FIG. 2I shows an example of this approach.

As shown, a glass or polymeric barrier layer 292 is formed on a foil bonding layer 294 (e.g., aluminum or aluminum alloy foil) to form a barrier layer laminate 296. The barrier layer may be deposited by chemical vapor deposition, physical vapor deposition, coating or other process identified herein. Subsequently, a layer of active metal 298 (e.g., lithium) is bonded to the laminate 296. The active metal layer may have an affixed current collector.

An advantage of this process is simple processing, since the bonding layer can also act as the substrate for the barrier layer. Also, a bonding layer such as aluminum foil is more resistant to high temperature treatment than some polymeric supports (e.g., PET). In some processing operations such as hot pressing or hot rolling, the barrier layer laminate will be exposed to a relatively high temperature. In such situations, the bonding layer will better serve as the barrier layer substrate.

Barrier Layer Composition

The barrier layer is preferably composed of a glass or amorphous material that is conductive to metal ions of the negative electrode metal. Preferably, the barrier layer does not conduct anions such as $S_8^=$ generated on discharge of a sulfur electrode (or other anions produced with other positive electrodes), or anions present in the electrolyte such as perchlorate ions from dissociation of lithium perchlorate.

In order to provide the needed ionic conductivity, the barrier layer may contain a mobile ion such as a metal cation of the negative electrode metal. Many suitable single ion conductors are known. Among the suitable glasses are those that may be characterized as containing a "modifier" portion and a "network former" portion. The modifier is often an oxide of the active metal in (i.e., the metal ion to which the barrier layer is conductive). The network former is often a polymeric oxide or sulfide. One example is the lithium silicate glass $2Li_2O.1SiO_2$ and another example is the sodium borosilicate glass $2Na_2O.1SiO_2.2B_2O_3$.

The modifier/network former glasses employed in this invention may have the general formula $(M_2O).X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O—O bonds are broken yielding Si—O$^-$ Li$^+$. The limit of $Li_2O$ addition is at the completely ionic stoichiometry, which for silica would be $Li_4SiO_4$, or $2Li_2O.SiO_2$ ($Li_2O.0.5SiO_2$). Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or $3Li_2O.B_2O_3$, $Li_3AlO_3$ or $3Li_2O.Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O).X(A_nD_m).Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2O.YLiCl.XB_2O_3ZSiO_2$.

Some other single ion conductor glasses may also be employed as a barrier layer used with this invention. One example is a lithium phosphorus oxynitride glass referred to as LIPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LiPON is $Li_{2.9}PO_{3.3}N_{0.5}$. Examples of other glass films that may work include $6LiI-Li_3PO_4-P_2S_5$ and $B_2O_3-LiCO_3-Li_3PO_4$.

Polymeric barrier layers may also serve as effective barrier layers. Generally, these layers should meet the same performance requirements set for the glass barrier layers. In some cases, polymeric materials may be preferred because they tend to be more flexible and hence less likely to crack than inorganic glass materials. Further, if a polymeric (or organic and/or inorganic) barrier layer is used, a separate bond layer may not be necessary. In such cases, the reaction between the active metal and the exposed surface of the barrier layer may provide sufficient bonding to affix the barrier layer to the active metal.

Examples of materials that may be suitable as polymeric barrier layers include compounds that contain nitrogen and/or phosphorus in the polymer backbone or sidechain and polymers with a low solubility for anions. In the case of a nitrogen and/or phosphorus containing material, the reaction with the active metal may lead to the formation of an ionically conductive nitride layer such as $Li_3N$ or $Li_3P$. Other elements besides nitrogen or phosphorus may be employed if they are sufficiently reactive with the active metal to facilitate bonding with the metal. Preferably, the polymeric material exhibits a self-limiting reaction with active metal so as not to be completely consumed. By limiting the amount of nitrogen, phosphorus, or other reactive component in the polymeric barrier layer, the reaction will be self-limiting. Specific examples of suitable polymeric barrier layer materials include polyphosphazene, polyglycols, and acrylates. In one embodiment, the polymer barrier material is an ultraviolet curable acrylate or diacrylate (e.g., Tetraethylene Glycol Diacrylate, Polyethylene Glycol 200 Diacrylate, Polyethylene Glycol 400 Diacrylate, Polyethylene Glycol 200 Dimethacrylate, Polyethylene Glycol 400 Dimethacrylate, Polyethylene Glycol 600 Dimethacrylate, Polyethylane Glycol 200 Diacrylate, N-Vinyl-2-Pyrrolidone, Acrylonitrile, Diethylaminoethyl Acrylate, Diethylaminoethyl Methacrylate, Diisopropylaminoethyl Methacrylate, Dimethylaminopropyl Methacrylamide, and Methoxyethyl Acrylate)

In some embodiments, the barrier layer may include inorganic and organic components of the types described above. Such "mixed" compositions can be prepared in a variety of ways. For example, a mixture containing precursors (monomers) for inorganic and organic polymers is polymerized resulting in an intimate interpenetrating network of organic and inorganic polymers. In a specific example, a porous inorganic network layer is formed by hydrolysis of an appropriate alkoxide such as TEOS (tetraethylorthosilicate). This is followed by infiltration with an organic monomer (such as an acrylate or diacrylate of the types mentioned above) and subsequent polymerization to yield an inorganic/organic polymer composite. In other example, polymerization takes place in a CVD chamber. Depending upon the CVD conditions, the resulting product may be an inorganic polymer at one extreme and an organic polymer at the other extreme. The amount of oxygen introduced into the plasma containing TEOS or related compound may, for example, control the relative amounts of organic and inorganic materials in the barrier layer. Therefore, the polymerization reaction may be moderated such that the resulting polymer is an intimate blend of inorganic and organic polymer.

Regarding thickness, barrier layers generally should be as thin as possible while still effectively protecting the metal electrode. Thinner layers have various benefits. Among these are flexibility and low ionic resistance. If a layer becomes too thick, the electrode cannot bend easily without cracking or otherwise damaging the barrier layer. Also, the overall resistance of the barrier layer is a function of thickness. However, the barrier layer should be sufficiently thick to prevent electrolyte or certain aggressive ions from contacting the underlying alkali metal. The appropriate thickness will depend upon the deposition process and the barrier layer material. If the deposition process produces a high quality barrier layer, then a rather thin layer can be employed. A high quality barrier layer will be smooth and continuous and free of pores or defects that could provide a pathway for lithium metal or deleterious agents from the electrolyte.

For many thin film batteries, the optimal thickness of the barrier layer will range between about 50 angstroms and 5 micrometers. More preferably, the thickness will range between about 100 angstroms and 3,000 angstroms. Even more preferably, the thickness will range between about 500 angstroms and 2,000 angstroms. For many high quality barrier layers, an optimal thickness will be approximately 1000 angstroms. For non-thin film batteries, the barrier layer thickness may be substantially thicker, so long as the total film resistance is not too great.

In addition, the composition of the barrier layer should have an inherently high ionic conductivity (e.g., between about $10^{-8}$ and about $10^{-2}$ $(ohm-cm)^{-1}$). Obviously, if a relatively good quality thin layer can be deposited, a material with a relatively low conductivity may be suitable. However, if relatively thicker layers are required to provide adequate protection, it will be imperative that the composition of the barrier layer have a relatively high conductivity.

Bonding Layer

The bonding layers employed with this invention generally should bond well with or adhere to the active material. They should improve the bond between barrier layer and the active material. Alternatively, or in addition, they should improve the electrochemical properties of the active material as an electrode material in the battery of interest. The thickness of the bonding layer depends upon the materials employed (barrier layer, electrode layer, and bonding layer) and will be chosen to optimize the electrode's electrochemical properties, the electrode fabrication cost and ease, and the effectiveness of the barrier layer. Note that after the bonding is completed, a distinct bonding layer may not remain. It is possible that the bonding layer is completely integrated into the active layer.

In an especially preferred embodiment, the bonding layer is a foil bonding layer. As a foil, it will be a free-standing metal or metal alloy. It should be sufficiently thick that it can be handled during processing in accordance with this invention. For example, it should have sufficient mechanical integrity to allow the handling necessary for pressing and/or rolling operations (e.g., calendering). Different materials have different intrinsic mechanical properties, so different minimum thicknesses may be appropriate for the different materials. Generally, in a preferred embodiment, the foil thickness is between about 0.1 and 100 micrometers. The particular application may also drive the choice of a thickness. For example, in primary battery applications, relatively thicker foils may be employed. In these applications, a relatively large amount of lithium (or other active electrode material) is used. In secondary battery applications, where relatively less lithium is used, thinner bonding layer foils are more appropriate.

In the case of lithium electrodes, preferred bonding layer materials include metals such as aluminum, silicon, zinc, manganese, silver, antimony, magnesium, lead, tin, iron, titanium and also alloys of such metals. In a preferred embodiment, the bonding layer metal is selected from the following group: aluminum, silicon, magnesium, tin, lead, and their alloys. The bonding layer may also be made from an insertion compound such as carbon, spinel $Mn_2O_4$, $NiO_2$, $CoO_2$, $VO_x$, pyrite ($FeS_2$), $MoO_2$, $SnO_2$, $TiO_2$, and the like. Still further, the bonding layer may be made from an organic material such as polyethylene oxide, polyethylene glycol, polyaniline, polyacetylene, polypyrrole, and the like. Obviously, many organic materials, oxides, and sulfides can not conveniently exist as foils.

If aluminum or an aluminum alloy is chosen, the bonding layer thickness preferably lies above about 100 angstroms (recognizing that the lower end of this range is not appropriate for foils). In a further preferred embodiment, the thickness ranges from about 100 angstroms to about 100 micrometers. Generally, evaporation, sputtering, or similar processes produce relatively thin layers. For bonding materials that allow it, a coating process may be employed. Coated layers are generally thicker, on the order of micrometers or even millimeters. Foil bonding layers may be attached to barrier layer laminate by pressing, rolling (e.g., calendering), or other suitable process. Such bonding processes may be performed at room temperature, or an elevated temperature. When the bonding material imparts a desirable electrochemical property to the active metal, relatively large amounts of the bonding material should be employed, possibly requiring relatively thick foil layers.

Preferably, the bonding layer metal does not substantially react with ambient chemicals such as oxygen, carbon dioxide, water, or nitrogen. Aluminum, for example, meets this criterion, even though it reacts with ambient oxygen and/or moisture to form a thin tenacious oxide coating. The low reactivity to ambient compounds allows the barrier layer laminate to be stored and processed in ambient conditions, thus reducing the cost and inconvenience of storing and handling. In some cases, the bonding layer may even allow the lithium laminate to be processed in ambient conditions. Lithium metal oxidizes very rapidly under ambient conditions. Thus, it is normally processed under a vacuum. In some embodiments of this invention, however, the current collector and barrier layer laminates may be bound to one another in ambient conditions. Aluminum and lithium alloy so easily and completely, that it is believed that some amount of lithium oxidation may be tolerable during the bonding process. A surface layer of lithium oxide or carbonate may not block bonding between aluminum and lithium. Further, the oxygen molecules may become distributed throughout the alloy in a manner that does not substantially degrade the electrochemical performance of the resulting electrode.

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the barrier layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing.

Figure 3:
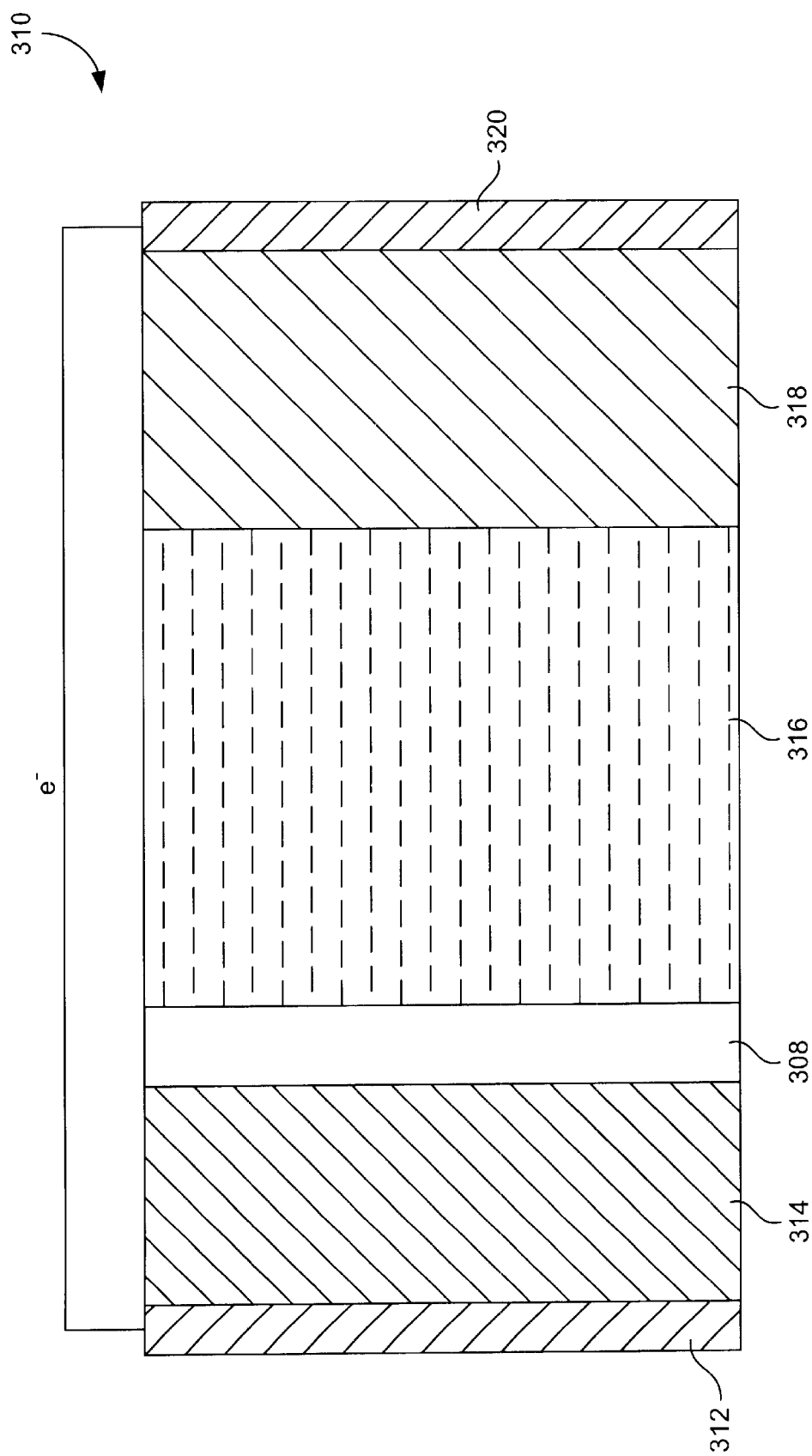
FIG. 3 is a block diagram of a battery formed from an electrode of the present invention.

Referring now to FIG. 3, a cell 310 in accordance with a preferred embodiment of the present invention is shown. Cell 310 includes a negative current collector 312, which is formed of an electronically conductive material. The current collector serves to conduct electrons between a cell terminal (not shown) and a negative electrode 314 (such as lithium) to which current collector 312 is affixed. Negative electrode 314 is made from lithium or other similarly reactive material, and includes a barrier layer 308 formed opposite current collector 312. If the bonding layer does not diffuse into the active metal, there may be a separate layer of the bonding material (not shown) between the negative electrode and the barrier layer. Barrier layer 308 contacts an electrolyte in an electrolyte region 316. As mentioned, the electrolyte may be liquid, gel, or solid (e.g., polymer). An example of a solid electrolyte is polyethylene oxide. An example of gel electrode is polyethylene oxide containing a significant quantity of entrained liquid such as an aprotic solvent.

In the case of a liquid electrolyte, an optional separator in region 316 prevents electronic contact between the positive and negative electrodes. A positive electrode 318 abuts the side of separator layer 316 opposite negative electrode 314. Because electrolyte region 316 is an electronic insulator and an ionic conductor, positive electrode 318 is ionically coupled to but electronically insulated from negative electrode 314. Finally, the side of positive electrode 318 opposite electrolyte region 316 is affixed to a positive current collector 320. Current collector 320 provides an electronic connection between a positive cell terminal (not shown) and positive electrode 318.

Current collector 320, which provides the current connection to the positive electrode, should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrodes can be pressed together with the electrolyte separator. In order to provide good electrical conductivity between the positive electrode and a metal container, an electronically conductive matrix of, for example, carbon or aluminum powders or fibers or metal mesh may be used.

When a liquid electrolyte is employed, a separator may, as mentioned, occupy all or some part of electrolyte compartment 316. If a separator is used, preferably it will be a highly porous/permeable material such as felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In certain specific embodiments, the separator is Celgard 2300 or Celgard 2400 available from Hoechst Celanese of Dallas, Tex.

In an alternative embodiment, the barrier layer on the negative electrode prevents the positive and negative electrodes from contacting one another and serves the function of an electrolyte separator. In such cases, the barrier layer should be highly conductive, as well as particularly tough and resistant to cracking and abrasion.

In some embodiments of the invention, the cell may be characterized as a "thin film" or "thin layer" cell. Such cells possess relatively thin electrodes and electrolyte separators. Preferably, the positive electrode is no thicker than about 300 $\mu$m, more preferably no thicker than about 150 $\mu$m, and most preferably no thicker than about 100 $\mu$m. The negative electrode preferably is no thicker than about 200 $\mu$m and more preferably no thicker than about 100 $\mu$m. Finally, the electrolyte separator (when in a fully assembled cell) is no thicker than about 100 $\mu$m and more preferably no thicker than about 40 $\mu$m.

The present invention can be used with any of a number of battery systems employing a highly reactive negative electrode such as lithium or other alkali metal. For example, any positive electrode that may be used with lithium metal or lithium ion batteries can be used with this invention. These include lithium manganese oxide, lithium cobalt oxide, lithium nickel oxide, lithium vanadium oxide, etc. Mixed oxides of these compounds may also be employed such as lithium cobalt nickel oxide. As will be explained in more detail below, a preferred application of the electrodes of this invention is in lithium-sulfur batteries.

While the above examples are directed to rechargeable batteries, the invention may also find application in primary batteries. Examples of such primary batteries include lithium-manganese oxide batteries, lithium-(CF)$_x$ chloride batteries, lithium sulfur dioxide batteries and lithium iodine batteries. In a particularly preferred embodiment, these primary batteries would be formed in the discharged state; that is, the lithium is plated to the negative electrode in situ. In this embodiment, the primary cells would have extremely long shelf lives because no free lithium is present during the storage and transportation phase.

The barrier layer allows one to use a reactive lithium metal electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites of lithium which grow from the lithium electrode across the electrolyte and to the positive electrode where they short circuit the cells. Not only do these short circuits prematurely kill the cells, they pose a serious safety risk. The barrier layer of this invention prevents formations of dendrites and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical energy, it simply represents dead weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. Pat. No. 6,030,720 naming Chu et al. as inventors, issued on Feb. 29, 2000. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units (CH$_2$CH$_2$O). This may be a glyme or related compound. Such solvents are believed to strongly coordinate lithium and thereby increase the solubility of discharge products of lithium-sulfur batteries. Suitable liquid electrolyte solvents are described in more detail in U.S. pat. application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (ThF), dioxolane, propylene carbonate (PC), ethylene carbonate (EC), dimethyl carbonate (DMC), butyrolactone, N-methylpyrrolidinone, dimethoxyethane (DME or glyme), hexamethylphosphorarnide, pyridine, N,N-diethylacetamide, N,N-diethylformamide, dimethylsulfoxide, tetramethylurea, N,N-dimethylacetamide, N,N-dimethylformaide, tributylphosphate, trimethylphosphate, N,N,N',N'-tetraethylsulfamide, tetraethylenediarnine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The barrier layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator, which contains essentially no liquid. Specific examples of solidstate ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W.R. Grace & Co. and U.S. Pat. Nos. 5,460,904, 5,540,741, and 5,607,485 all assigned to Bellcore, for example. The entire disclosure of each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper.

Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and barrier layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

Preferably, the lithium-sulfur battery cells of this invention (as well as other battery cells disclosed herein) may be rechargeable "secondary" cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

EXAMPLES

In Examples 1–3, a LiPON glass electrolyte was deposited onto a smooth surface of Kynar film on PET (polyethyleneterephthalate) substrate. After the deposition of the glass electrolyte, an aluminum film was evaporated onto the glass/Kynar/PET laminate. Lithium foil pressed onto stainless steel current collector was then combined with the aluminum/glass/Kynar/PET structure such that the lithium and aluminum surfaces are in contact with each other. The resulting structure was placed between two glass plates and clamped. Diffusion of lithium atoms from the bulk of lithium electrode into aluminum leads to the formation of thin layer of lithium-aluminum alloy between lithium electrode and LIPON layer.

This process has some important benefits that may not be realized with the process described in U.S. patent application Ser. No. 09/139,601, which was previously incorporated by reference. First, because of the alloy formation, lithium sticks to the glass electrolyte very well, which allows for peeling off of PET substrate without cracking the LIPON glass layer. Lithium-aluminum alloy is not as chemically active as pure lithium and can give additional protection to lithium against reactions with oxidizing species from electrolyte if the glass layer has any pinholes. The use of such construction avoids the need for vacuum deposition of lithium onto the glassy layer and combining of the deposited lithium layer with lithium layer on the current collector in a vacuum chamber. The process of vacuum deposition of lithium is replaced with vacuum deposition of aluminum, which is a much less complicated procedure. Combining of the two lithium surfaces in a vacuum chamber is replaced by combining lithium foil and aluminum layer, which can be accomplished in a glove ox filled with argon or even a dry room, standard equipment in lithium battery production.

Example 1

Samples of LiPON/Kynar/PET were used to bond to lithium foil. First Kynar was extruded onto the PET carrier. Next the LIPON barrier layer was sputtered onto the Kynar layer. The resulting thickness of the LIPON, Kynar, and PET were approximately 200 nm, 4 micron, and 25 micron, respectively. This sample was transferred into an argon-filled glove box. Lithium foil 125 $\mu$m thick from Argo-Tech Co. (Canada) was pressed onto stainless steel current collector and then combined with the LiPON/Kynar/PET structure such that the lithium and LIPON surfaces were in contact with each other. The films were placed between two glass plates, clamped, and stored at room temperature for approximately two days. After storage, the structure was unclamped, and inverted such that the PET layer was on top. Then attempts were made to peel off the PET layer using tweezers. Since there was minimal adhesion between the LIPON and lithium, it was difficult to peel off the PET carrier while maintaining contact between the LIPON and lithium.

Example 2

A thin aluminum film of approximately 150 nm (0.15 microns) was evaporated onto a LiPON/Kynar/PET sample prepared as described in Example 1. The resulting sample was transferred into an argon-filled glove box. Lithium foil 125 $\mu$m thick from Argo-Tech Co. (Canada) was pressed onto stainless steel current collector and then combined with the Al/LiPON/Kynar/PET structure such that the lithium and aluminum surfaces were in contact with each other. The films were placed between two glass plates, clamped, and stored at room temperature. Formation of lithium-aluminum alloy was monitored through the transparent PET/Kynar/LiPON sample. Since the light reflectance of the smooth aluminum layer is very high and the reflectance of the LiAl alloy is much lower, an observed drop in reflectance corresponded to alloy formation. The formation of low reflectance gray lithium-aluminum alloy was observed immediately and after about one hour approximately 95% of the surface area is completely alloyed. Apparently due to non-uniformity of the clamp pressure and film thickness, isolated spots within the lithium and edges around the lithium did not alloy significantly, even upon further storage of up to two days at room temperature. To enhance the alloying process, the structure was heated and stored at 55° C. in an oven inside the glove box for one day. This resulted in higher alloy homogeneity. After storage, the structure was cooled to room temperature, unclamped, and inverted such that the PET layer was on top. Then, the PET layer was peeled off using tweezers. The resulting laminate of LiPON/Kynar/LiAl—Li had very good adhesion and no visible damage to the glass layer was observed.

Example 3

This procedure was identical to that of Example 2, except that bonding took place at room temperature for one hour. There was no additional storage at 55° C. Thus, the bonding procedure was identical to that of Example 1, except that no aluminum bonding layer was employed. The resulting adhesion was not as good as Example 2, but much, much better than Example 1 (without aluminum).

Example 4

Two types of samples, lithium/LiPON/Kynar/PET and lithium/Cu were made. The first type, Li/LiPON/Kynar/PET was made by extruding Kynar onto the PET carrier. Then the LIPON barrier layer was sputtered onto the Kynar layer. Finally, lithium was evaporated onto the LIPON. The resulting thickness of the lithium, LiPON, Kynar, and PET are approximately 3 micron, 200 nm, 4 micron, and 25 micron, respectively. The second type of sample, Li/Cu was made by evaporating lithium on to copper foil. The resulting thickness of lithium and Cu are 8 and 17 micron, respectively.

In a dryroom, attempts were made to bond the two samples together. The Cu/Li sample was combined with the Li/LiPON/Kynar/PET sample such that the two lithium surfaces were in contact with each other. Three variations with different heat and pressure conditions were used: 1) uniaxial pressure to 6,000 psi and then 60° C. heating overnight; 2) pressing at 20 psi to a temperature of 170° C. (near the melting point of lithium); and 3) high pressure rolling to 20,000 psi. None of the processes resulted in Li—Li bonding. With no adhesion between the Li—Li surfaces, the PET could not be removed without damaging the LIPON.

Example 5

The sample, lithium/LiPON/Kynar/PET, described in Example 4 was used with a sample of Li/Stainless Steel. The sample of Li/SS was made by pressing 125 micron thick lithium foil from Argo-Tech Co. (Canada) onto a stainless steel current collector.

In a dryroom, a thin aluminum foil approximately 0.8 microns was sandwiched between the Li/LiPON/Kynar/PET and the Li/SS. The resulting structure of PET/Kynar/LiPON/Li/Al/Li/SS was pressed for two hours with a hydraulic press to 6,000 psi. Alloy formation of LiAl can be monitored through the transparent PET/Kynar/LiPON sample. Since the light reflectance of smooth aluminum layer is very high and the reflectance of the LiAl alloy is much lower, the observed drop in reflectance corresponded to the completion of alloy formation. The formation of low reflectance gray LiAl alloy was observed after the compression. Approximately 95% of the surface area was completely alloyed. Due to non-uniformity of the clamp pressure and film thickness, isolated spots within the lithium and edges around the lithium does not alloy much with further pressing. To enhance the alloying process, the structure was heated and stored at 60° C. in an oven inside the glove box overnight. This resulted in higher alloy homogeneity. After storage, the structure was cooled to room temperature and inverted such that the PET layer was on top. Then, the PET layer was peeled off using tweezers. The resulting laminate of Kynar/LiPON/Li—Al—Li/SS had very good adhesion and no visible damage to the glass layer was observed.

Electrochemical cells using the resulting laminate of Kynar/LiPON/Li—Al—Li/SS as the anode were made. The cells were then evaluated with a Series 4000 battery test system from Maccor Inc. of Tulsa OK. These cells were discharged at a current density of 0.5 mA/cm$^2$ to a cutoff voltage of 1.8 volts. The theoretical capacity of the 3 micron evaporated lithium (in the LIPON containing laminate) is approximately 0.6 mAh/cm$^2$. These cells discharged in excess of 7 mAh/cm$^2$ on the first discharge, demonstrating electrochemical transparency of the Li—Li bond. Subsequent recharged and then discharge still showed a discharge capacity in excess of 6 mAh/cm$^2$. Note that the stainless steel layer included more than 40 times the amount of lithium than was present in the LiPON laminate.

Example 6

A sample of LiPON/Al was made by sputtering LIPON onto four micron thick aluminum foil. This sample was transferred into a dryroom. Lithium foil 125 $\mu$m thick from Argo-Tech Co. (Canada) was pressed onto stainless steel current collector and combined with the LiPON/Al structure such that/the lithium and aluminum surfaces were in contact with each other. The films were pressed and heated under similar conditions described in Example 4. Since the aluminum and lithium alloy very easily, the resulting LiPON/Al/Li laminate had very good adhesion.

OTHER EMBODIMENTS

The foregoing describes the instant invention and its presently preferred embodiments. Numerous modifications and variations in the practice of this invention are expected to occur to those skilled in the art. For example, the invention may provide overcharge protection as described in U.S. Pat. No. 5,686,201 issued Nov. 11, 1997 and titled RECHARGEABLE POSITIVE ELECTRODES and U.S. Pat. No. 5,882,812, issued Mar. 16, 1999, and titled OVERCHARGE PROTECTION SYSTEMS FOR RECHARGEABLE BATTERIES. Such modifications and variations are encompassed within the following claims.

The entire disclosures of all references cited herein are incorporated by reference for all purposes.

What is claimed is:

1. A method of fabricating an active metal electrode, the method comprising:

(a) providing a barrier layer laminate comprising (i) a barrier layer disposed on a substrate, the barrier layer forming a substantially impervious layer which is conductive to ions of the active metal, and (ii) a foil bonding layer disposed on the barrier layer, the foil bonding layer capable of forming a bond with the active metal; and (b) bonding active metal to the foil bonding layer.

2. The method of claim 1, wherein the substrate on which the barrier layer is disposed is a releasable web carrier.

3. The method of claim 2, wherein the releasable web carrier includes a release layer of copper, tin, zinc, aluminum, iron, a polymeric material, or combination thereof on which the barrier layer is disposed.

4. The method of claim 1, wherein the substrate on which the barrier layer is disposed is a solid-state or gel-state electrolyte separator.

5. The method of claim 1, wherein the substrate on which the barrier layer is disposed is a polymeric electrolyte separator.

6. The method of claim 1, further comprising forming the barrier layer on the substrate by a physical deposition process or a chemical vapor deposition process.

7. The method of claim 1, wherein the barrier layer is a glass layer that includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide.

8. The method of claim 1, wherein the barrier layer comprises an organic polymeric material.

9. The method of claim 8, wherein the organic polymeric material includes at least one of nitrogen atoms or phosphorus atoms.

10. The method of claim 1, wherein the barrier layer is a glass layer having a thickness of between about 50 angstroms and 5 micrometers.

11. The method of claim 1, wherein the barrier layer has an ionic conductivity of between about $10^{-8}$ and about $10^{-2}$ (ohm-cm)$^{-1}$.

12. The method of claim 1, wherein the foil bonding layer is not substantially reactive with moisture and air.

13. The method of claim 1, wherein the foil bonding layer is comprised of at least one of aluminum, an aluminum alloy, silicon, zinc, manganese, silver, antimony, magnesium, lead, tin, iron, titanium and alloys of such metals.

14. The method of claim 1, wherein the foil bonding layer is comprised of aluminum or an aluminum alloy.

15. The method of claim 1, wherein the foil bonding layer is an aluminum layer or aluminum alloy layer having a thickness between about 0.1 micrometers and 100 micrometers.

16. The method of claim 1, further comprising attaching a current collector on the active metal.

17. The method of claim 1, wherein the active metal is lithium or an alloy of lithium.

18. The method of claim 1, wherein the active metal is lithium or an alloy of lithium and has a thickness of at least about 0.2 micrometers.

19. The method of claim 1, wherein bonding active metal to the foil bonding layer comprises bonding a free standing lithium layer to the foil bonding layer.

20. The method of claim 1, wherein bonding the active metal to the foil bonding layer comprises bonding a laminate of an active metal layer and a current collector layer to the foil bonding layer.

21. The method of claim 1, wherein bonding the active metal to the foil bonding layer comprises pressing an active metal layer to the barrier layer laminate.

22. The method of claim 21, wherein pressing the active metal layer to the barrier layer laminate is done in a hot press.

23. The method of claim 1, wherein bonding the active metal to the foil bonding layer comprises evaporating or sputtering the active metal on to the barrier layer laminate.

24. An active metal electrode formed by the method of claim 1, wherein the bonding layer is a metal.

25. A battery comprising the active metal electrode of claim 24.

26. The battery of claim 25, wherein the battery is a lithium-sulfur battery.

27. The method of claim 1,
wherein the barrier layer laminate further comprises an active metal layer that is disposed on a side of the foil bonding layer that is opposite the barrier layer, and
wherein bonding the active metal to the foil bonding layer comprises bonding the active metal to the active metal layer of the barrier layer laminate.

28. A method of fabricating an active metal electrode, the method comprising:
(a) providing a barrier layer laminate comprising a barrier layer disposed on a substrate, the barrier layer forming a substantially impervious layer which is conductive to ions of active metal;
(b) attaching a foil bonding layer to the barrier layer of the barrier layer laminate, wherein the foil bonding layer comprises a material capable of forming a bond with active metal; and
(c) bonding active metal to the foil bonding layer.

29. A barrier layer laminate for use in fabricating an active metal electrode, the barrier layer laminate comprising:
(i) a substantially smooth and flat substrate;
(ii) a barrier layer disposed on the substrate, the barrier layer forming a substantially impervious layer which is conductive to ions of the active metal, and
(iii) a foil bonding layer disposed on the barrier layer, wherein the foil bonding layer comprises a material capable of forming a bond with the active metal.

30. The barrier layer laminate of claim 29, wherein the substrate on which the barrier layer is disposed is a releasable web carrier.

31. The barrier layer laminate of claim 29, wherein the substrate on which the barrier layer is disposed is a polymeric electrolyte separator.

32. The barrier layer laminate of claim 31, wherein the polymeric electrolyte separator comprises a material selected from the group consisting of polyethers, polyimines, polythioethers, polyphosphazenes, and polymer blends, mixtures, and copolymers thereof.

33. The barrier layer laminate of claim 31, wherein the polymeric electrolyte separator comprises a polyalkylene oxide.

34. The barrier layer laminate of claim 29, wherein the barrier layer includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide.

35. The barrier layer laminate of claim 29, wherein the barrier layer is a glass layer having a thickness of between about 50 angstroms and 5 micrometers.

36. The barrier layer laminate of claim 29, wherein the barrier layer is a glass and has a thickness of between about 500 angstroms and 2000 angstroms.

37. The barrier layer laminate of claim 29, wherein the foil bonding layer is not substantially reactive with moisture and air.

38. The barrier layer laminate of claim 29, wherein the foil bonding layer is comprised of at least one of aluminum, an aluminum alloy, silicon, zinc, manganese, silver, antimony, magnesium, lead, tin, iron, titanium and alloys of such metals.

39. The barrier layer laminate of claim 29, wherein the foil bonding layer is comprised of aluminum or an aluminum alloy.

40. The barrier layer laminate of claim 29, wherein the foil bonding layer is an aluminum or aluminum alloy layer having a thickness between about 0.1 micrometers and 100 micrometers.

41. The barrier layer laminate of claim 29, wherein the active metal is lithium or an alloy of lithium.

42. An active metal electrode comprising an active metal layer bonded to the foil bonding layer of the barrier layer laminate of claim 29.

43. A battery comprising the active metal electrode of claim 42.

44. The battery of claim 43, wherein the battery is a lithium-sulfur battery.

45. An active metal electrode capable of serving as a negative electrode in a battery, the active metal electrode comprising:
(i) a barrier layer forming a substantially impervious layer which is conductive to ions of the active metal;
(ii) a first active metal layer having a first side disposed on to the barrier layer;
(iii) a bonding layer disposed on a second side, opposite the first side, of the active metal layer, the bonding layer material being capable of forming a bond with the active metal; and
(iv) a second active metal layer disposed on the bonding layer, wherein the bonding layer is sandwiched between the first and second active metal layers.

46. The active metal electrode of claim 45, further comprising a substantially smooth and flat substrate disposed on a first side of the barrier layer, wherein the active metal layer is disposed on a second side, opposite the first side, of the barrier layer.

47. The active metal electrode of claim 45, wherein the bonding layer is a foil bonding layer.

48. A method of fabricating an active metal electrode, the method comprising:
(a) providing a barrier layer laminate comprising a barrier layer disposed on a substrate, the barrier layer forming a substantially impervious layer which is conductive to ions of the active metal;
(b) providing an active metal laminate comprising at least one active metal layer and a bonding layer affixed to one another, wherein the bonding layer is capable of forming a bond with the active metal; and
(c) bonding at least the active metal laminate and the barrier layer laminate to form an electrode structure in which (i) the bonding layer is sandwiched between two separate active metal layers, at least one of which was provided in the active metal laminate, and (ii) one of the two separate active metal layers is affixed to the barrier layer provided in the barrier layer laminate.

49. The method of claim 48, wherein the bonding layer is a foil.

50. The method of claim 48,
wherein the active metal laminate consists essentially of the bonding layer and a single active metal layer, and
wherein bonding at least the active metal laminate and the barrier layer laminate comprises (a) bonding a second active metal layer to the bonding layer of the active metal laminate and (b) bonding the barrier layer of the barrier layer laminate to the single active metal layer of the active metal laminate.

51. The method of claim 48, wherein the barrier layer laminate further comprises a second active metal layer disposed on a side of the barrier layer opposite the substrate.

52. The method of claim 51,
wherein the active metal laminate comprises the bonding layer and a single active metal layer, and
wherein bonding at least the active metal laminate and the barrier layer laminate comprises bonding the second active metal layer to the bonding layer of the active metal laminate.

53. The method of claim 52, wherein the active metal laminate further comprises a current collector affixed to a side of the single active metal layer that is opposite the bonding layer.

54. The method of claim 48, wherein the barrier layer laminate further comprises (a) a second active metal layer disposed on a side of the barrier layer opposite the substrate and (b) a second bonding layer disposed on a side of the second active metal layer opposite the barrier layer.

55. The method of claim 54,
wherein the active metal laminate comprises the bonding layer and a single active metal layer, and
wherein bonding at least the active metal laminate and the barrier layer laminate comprises bonding the second bonding layer of the barrier layer laminate to the bonding layer of the active metal laminate.

56. The method of claim 55, wherein the active metal laminate further comprises a current collector affixed to a side of the single active metal layer that is opposite the bonding layer.

57. A method of fabricating an active metal electrode including a barrier layer forming a substantially impervious layer which is conductive to ions of the active metal, the method comprising:
(a) forming the barrier layer on a metal bonding layer to create a barrier layer laminate, the bonding layer being capable of forming a bond with the active metal; and
(b) bonding the barrier layer laminate to a layer of active metal by affixing the active metal layer to the bonding layer of the barrier layer laminate.

58. The method of claim 57, wherein the bonding layer is an aluminum foil or an aluminum alloy foil.

59. The method of claim 57, wherein the active metal is lithium or a lithium alloy.

* * * * *